Oct. 31, 1972    R. G. FRANK    3,701,643
MOVING GLASS LOCATING DEVICES
Filed May 11, 1971    3 Sheets-Sheet 1
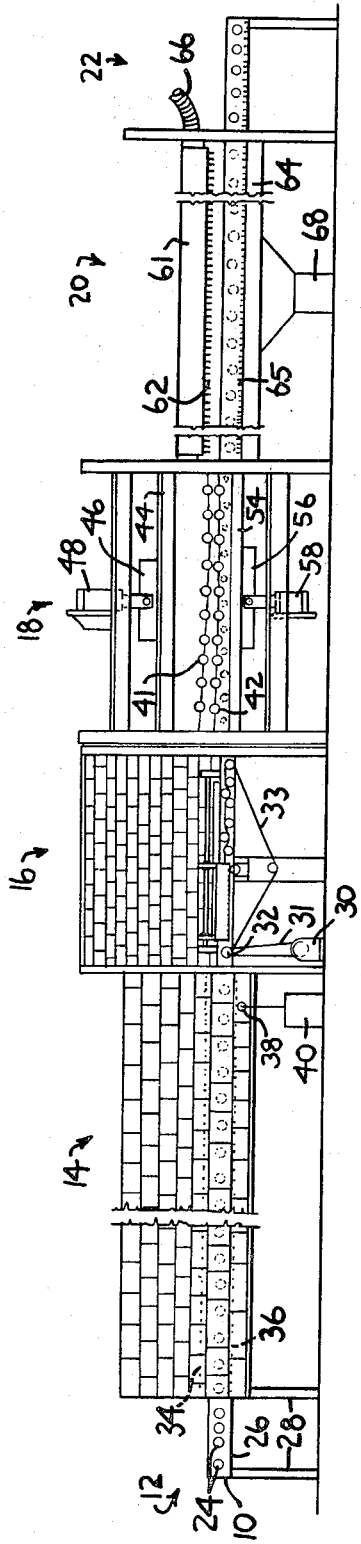
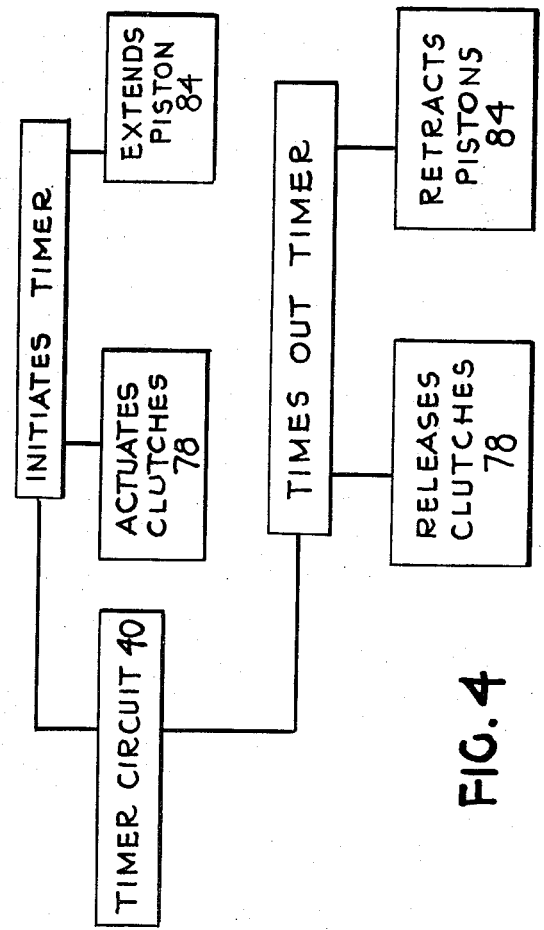
INVENTOR
ROBERT G. FRANK
BY
ATTORNEYS

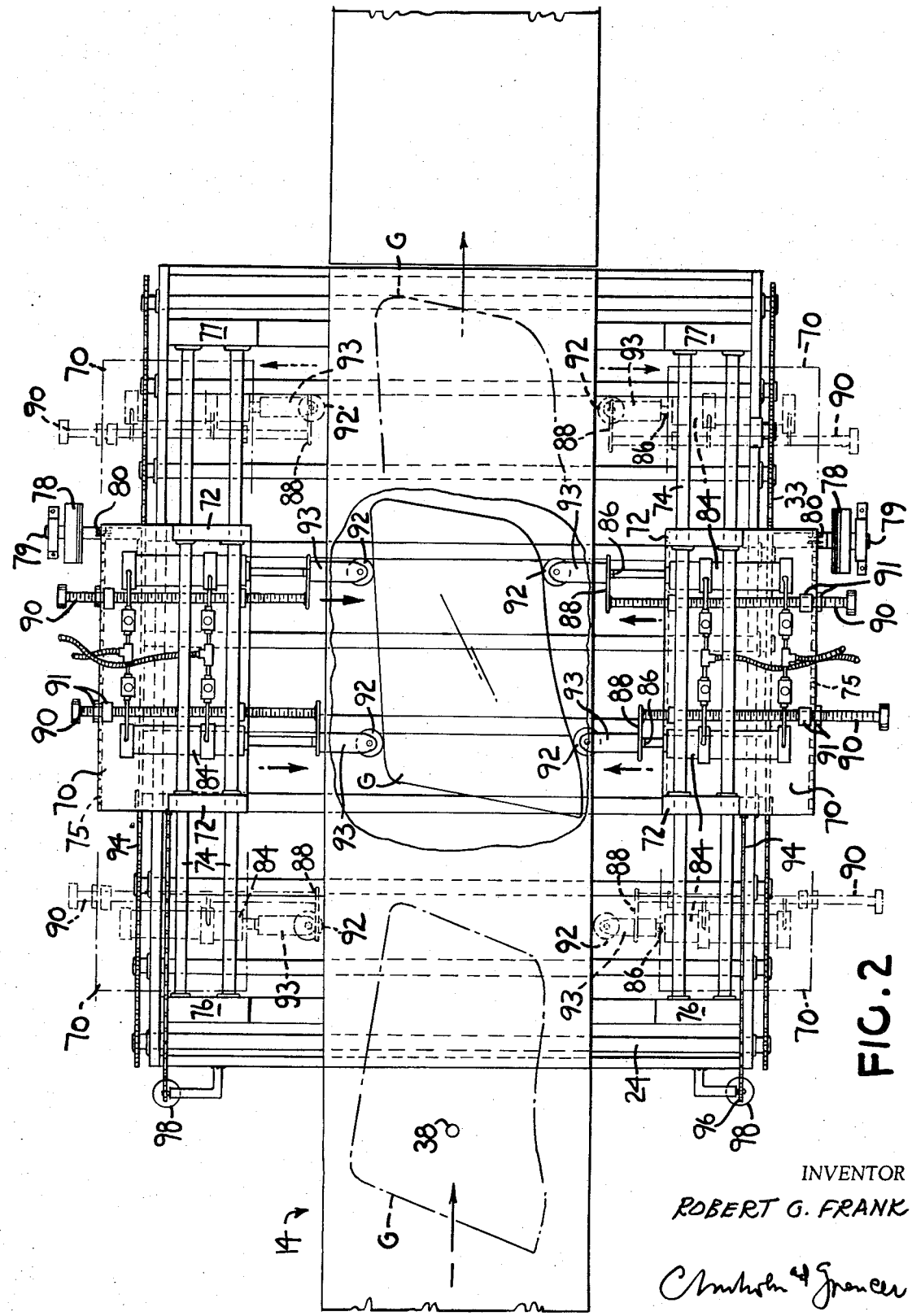

United States Patent Office 3,701,643
Patented Oct. 31, 1972

3,701,643
MOVING GLASS LOCATING DEVICES
Robert G. Frank, Tarentum, Pa., assignor to PPG
Industries Inc., Pittsburgh, Pa.
Filed May 11, 1971, Ser. No. 142,268
Int. Cl. C03b 23/02
U.S. Cl. 65—62
10 Claims

ABSTRACT OF THE DISCLOSURE

Apparatus for aligning and orienting moving glass sheets immediately prior to their treatment. This invention is especially suitable for use with glass sheets heated while conveyed through a furnace on a roller conveyor where the glass becomes misaligned or misoriented prior to entry into a shaping station. However, the invention is also capable of use with any type of conveyor defining an enclosed conveyor path for said glass sheets where the glass is liable to lose its orientation and/or alignment and must be oriented and/or aligned preparatory to processing.

BACKGROUND OF THE INVENTION

Field of the invention

The present invention relates to the treatment of moving glass sheets which require proper orientation and/or alignment prior to certain processing, such as shaping glass sheets or coating a selected portion where the portion of the glass to be coated must be aligned properly in a predetermined manner with respect to a coating means. The present invention is adapted for a mass production operation.

An illustrative embodiment of the present invention will describe the present invention relative to a continuous shaping of discrete glass sheets by the roll forming method. However, it will be understood that treatments other than bending may be applied to discrete glass sheets handled according to the present invention.

DESCRIPTION OF THE PRIOR ART

U.S. Pat. No. 3,455,672 to Alex G. Dompkowski transports deformable glass sheets from a shaping station to a quenching station using a reciprocating transfer carriage provided with moving fingers that are retracted to provide clearance for a glass sheet to enter the shaping station along a roll conveyor and be engaged by shaping molds that lift the glass off the roll conveyor during shaping. The fingers extend to engage the bent glass for transfer with the carriage to the quenching station and retract to dispose the glass on to the roll conveyor at the quenching station.

U.S. Pat. No. 3,265,484 to Ritter discloses glass engaging members that move between a raised position and a lowered position. In the lowered position, the glass engaging surfaces are disposed in the plane of the path taken by a glass sheet into a shaping station in order to engage the leading edge of the glass sheet being carried along the path to correctly position the sheet relative to the mold parts just as the conveyor movement is halted or just as the glass contacts the glass engaging members or the bending cycle is timed so that the lower mold part lifts the glass sheet off the conveyor at the same time as the sheet engages the members.

U.S. Pat. No. 3,332,759 to McMaster et al. discloses pivotable glass edge support devices for engaging a side edge and a lower surface of a glass sheet throughout the passage of the latter through a heating chamber.

U.S. Pat. No. 3,545,951 to Nedelec simultaneously applies glass contacting fingers that are operated together to engage each side edge as well as the leading and trailing edges of the flat sheet at a glass shaping station. All the actuating mechanisms for positioning are located internally and are not readily accessible for repair.

SUMMARY OF THE INVENTION

The present invention uses reciprocating carriages provided with a pair of glass edge engagement members whose purpose is to align rather than support a moving glass sheet while the moving sheet is conveyed along an enclosed conveyor leading to a glass processing station. The reciprocating carriages move in unison in paths exterior to the enclosed conveyor on opposite sides of the glass sheet at the same speed as the glass in the direction of glass sheet movement while the glass engaging members move into glass engaging positions limited by stop means to provide at least two longitudinally spaced points of contact along each of the opposite longitudinal side edges of the glass sheets being aligned and oriented properly preparatory for entry into a glass processing station such as a glass shaping station.

If the glass is not in proper orientation with respect to the shaping molds, the curvatures imparted to the glass will be skewed with respect to the dimensions of the glass. If the glass is not aligned properly in a transverse direction relative to the conveyor rolls, the only kinds of curvature that can be imported without departure from tolerance to the glass would be a cylindrical or spherical type of curve.

The present invention provides structure for orienting and aligning glass sheets by momentary engagement in which the actuating means for the elements that engage the glass are located in easily accessible position outside the heated enclosed atmosphere of a furnace to minimize the need for maintenance and provide easy access for maintenance when needed. The present invention also provides means to return the carriages with the glass engaging members retracted in time to receive the next glass sheet in the series.

An illustrated, preferred embodiment of relatively simple construction will be described.

BRIEF DESCRIPTION OF THE DRAWINGS

In the drawings which form part of the description and wherein like reference numbers refer to like structural elements, FIG. 1 is an elevational view of a roller type press bending apparatus incorporating a preferred embodiment of the present invention, FIG. 2 is a fragmentary plan view of a portion of the conveyor taken near the end of a tunnel type furnace showing a misaligned glass sheet in phantom, the carriage mechanisms shown with their glass engaging members engaging the side edges of a glass sheet in full lines and showing the position of the leading portion of certain structural elements of the carriages and the glass engaging members in phantom when the corresponding sheet is ready to leave the alignment and orientation area for entry into a shaping area, FIG. 4 is a chart describing the successive steps of the alignment and orienting cycle performed by the present invention.

DESCRIPTION OF A PREFERRED EMBODIMENT

Figure 3:
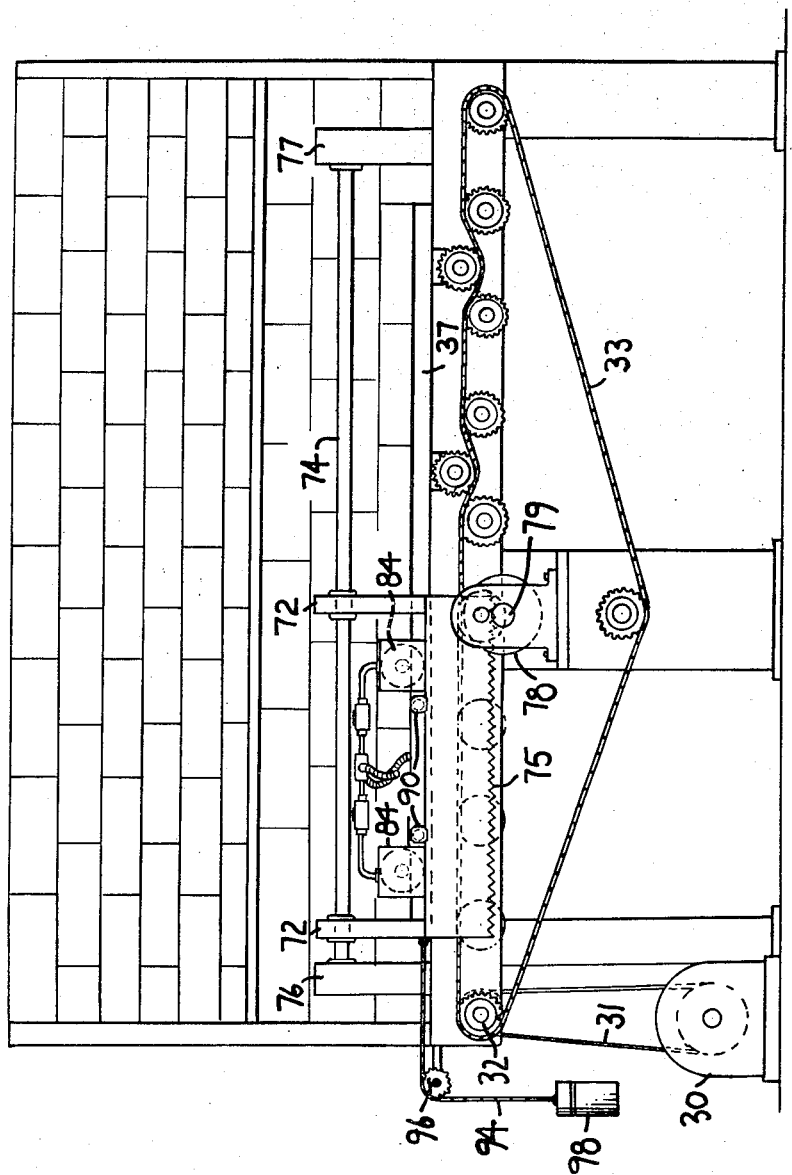
FIG. 3 is an enlarged detailed longitudinal side elevation of a transfer carriage and a portion of the aforesaid apparatus with the carriage in position poised to orient and align an oncoming glass sheet to be aligned and oriented.

The apparatus of the present invention comprises a horizontal conveyor 10 extending through a loading station 12, a tunnel type furnace 14, including an alignment and orienting station 16 near the exit end of said furnace, a bending station 18, a chilling station 20, and an unloading station 22. The horizontal conveyor 10 comprises a series of transversely extending, longitudinally spaced rolls 24 supported at their opposite ends on longitudinally extending supports 26 mounted on vertical pillars 28.

The entire conveyor is run continuously at an established conveyor speed from a drive motor 30 which is connected through a driving chain 31 to a drive sprocket 32 and chain drives 33 to sprockets fixed to the rolls 24 and interconnected by a driven chain to other drive sprockets fixed to each conveyor roll 24 in the usual manner. The rolls are disposed horizontally with a common horizontal plane tangent to the uppermost portion of the roll peripheries coextensive with a support plane along which a series of glass sheets is conveyed in an enclosed conveyor path extending through the furnace 14 and an extension of said path extending through the bending station 18, the chilling station 20 and the unloading station 22.

Furnace 14 has the usual heating elements 34 and 36 disposed above and below the path taken by glass sheets as the conveyor rolls 24 are rotated in unison to engage the glass sheets by friction. The side walls of the furnace are provided with aligned, parallel, longitudinally extending slots 37 (FIG. 3) on both sides of the alignment and orientation station 16 near the exit end of the furnace only just beyond a glass sensing mechanism 38. The latter is preferably a low pressure air tube which actuates a valve (not shown) which initiates a timer circuit 40. The operation of the latter will be described later.

Intermediate vertical planes occupied by each of the adjacent conveyor rolls 24 of the path extension portion in the bending station 18 is a pair of sets of shaped rolls 41 and 42 of complementary contour. Each upper shaped roll 41 is aligned with a corresponding lower shaped roll 42. The upper rolls are rotatably supported from their ends by vertically adjustable trunnions in an open frame structure 44 depending from an upper platform 46 which is attached to the lower end of a rod of an upper piston 48. Similarly, the lower rolls 42 are rotatably supported on vertically adjustable trunnions in a lower open frame 54 connected to and supported by a lower platform 56. The lower platform is attached to the upper end of a rod of a lower piston 58. Means is provided for rotating rolls 41 and 42 at approximately the same peripheral speed as rolls 24 so that when a glass sheet moves over the conveyor rolls at the bending station 18, the lower set of shaped rolls 42 move upward to lift the heat softened glass off the conveyor rolls 24 and into rolling contact against the upper set of shaped rolls 41 for a brief interval sufficient to impose the curvature of the rolls onto the heat softened glass sheet before the lower rolls 42 retract to redeposit the shaped glass sheet on the conveyor rolls 24. The details of the roll pressing apparatus do not form part of the present invention but is the subject matter of U.S. patent application Ser. No. 95,035 of Robert G. Frank, filed Dec. 4, 1970, the disclosure of which is incorporated herein by reference.

The chilling station 20 comprises an upper plenum chamber 61 having downwardly extending nozzles 62 whose exit openings are disposed above the conveyor rolls 24 that extend horizontally in a transverse direction in longitudinally spaced relation throughout the chilling station 20 and a lower plenum chamber 64 having upwardly facing nozzles 65 extending upward toward the spaces between the conveyor rolls 24 of the chilling station 20. Means are provided for delivering air under pressure through delivery passages 66 and 68 to the respective plenum chambers 61 and 64 so that cool air blasts may be imparted to the upper and lower surfaces of glass sheets that are conveyed through the chilling station 20.

The gist of the present invention is providing a pair of transfer carriages 70 disposed on opposite sides of the orienting and alignment station 16. Each carriage is provided with a super structure comprising a pair of apertured end brackets 72. Each pair of bracket apertures receives a pair of alignment rails 74. Each carriage also carries a longitudinally extending rack 75. The alignment rails are arranged in pairs extending longitudinally parallel to one another and to the side walls of the alignment chamber 16 at the end of the furnace 14 and extending between rear abutments 76 and front abutments 77 between which the alignment rails are connected.

A clutch 78 is provided for each carriage 70 on a carriage drive shaft 79 to engage a pinion 80 to rotate the latter to move the carriages 70 at the same linear speed as that of the conveyor rolls 24 whenever the clutches 78 are engaged. The clutches 78, when engaged, cause the pinions 80 to rotate on the racks 75 so that rotation of the pinions 80 when the clutches 78 are engaged causes the carriages to move from the rear abutment 76 at a first carriage position to the front abutment 77 at a second carriage position.

In addition, each carriage supports a pair of alignment pistons 84 and a stop member 86 for each alignment piston. Each stop member is limited in its laterally inward movement by an abutment plate 88. An externally threaded shaft 90 and lock nuts 91 are provided for positioning each associated abutment plate in a position corresponding to a position desired for its respective glass engagegment member.

There are two pistons 84 for each carriage. Each piston carries a glass engaging member in the form of a freely rotatable, horizontal disc 92 of a material that does not mar heated glass and that can withstand the temperature of the furnace, such as boron nitride, at the inner end of a narrow, elongated member 93 that extends transversely through one of the slots 37 and connects the disc 92 to its corresponding piston 84. The disc is supported in a plane slightly above that of the common plane tangential to the rolls 24 to enable the discs 92 to contact the opposite side edges of the glass when extended to a glass engaging position defined by said stop members without contacting the upper or lower surfaces of the glass.

Attached to each carriage 70 is a chain 94 entrained over the upper portion of the circumference of a free running wheel or pulley 96 with a weight 98 at the end of the chain 94. The weight pulls the carriage 70 back to the first carriage station when clutches 78 are disengaged.

The apparatus operates as follows. When a glass sheet G shown to the left of FIG. 2 in phantom has its trailing edge pass over the glass sensing mechanism 38 in the furnace 14, the timer circuit 40 is actuated to initiate a timer after sufficient time for the trailing edge of the glass sheet to leave the furnace based on the established conveyor speed. At this moment, the timer actuates the clutches 78 to cause the carriages 70 to move from the first carriage position adjacent rear abutments 76 toward the front abutments 77 at the same speed as the glass sheet G takes along the conveyor 10. At the same time, the timer circuit 40 causes pistons 84 to extend until the respective piston rods are prevented from moving further inward by the abutment plates 88. The amount that each piston extends is independent of the extension of each other piston to enable the apparatus to orient and align glass sheets having irregular outlines or patterns. By the time the carriage has reached its midway point between abutments 76 and 77, all the discs which serve as glass edge engaging members 92 have come into momentary engagement with the opposite side edges of the glass sheet G. This assures that the glass is both aligned and oriented properly. The carriages continue in the forward direction until the front end brackets 72 approach the front abutments 77. At that moment, the timer circuit 40 times out the timer. This releases the clutches 78 and retracts pistons 84. With the clutches 78 released, the weights 98 bring the carriages 70 back into the first carriage position adjacent the rear abutment 76 to await the arrival of the next glass sheet at approximately the same position it occupied for an immediately preceding glass sheet in a series to be processed on a mass production basis.

Proper synchronization of the carriages and the piston control makes it possible to align and orient each glass sheet within a few inches of the exit end of the furnace 14 and to treat each sheet in the series of sheets processed at approximately the same location along the enclosed conveyor, namely, between the first carriage position and the second carriage position. It is now possible to handle glass sheets of irregular outline as well as rectangular glass sheets and it is now possible to avoid the problems of having poor alignment or misorientation cause problems when glass sheets are to be bent to any other but the most simple of curvatures. There is not need to contact either the leading edge or the trailing edge of the sheets. Two spaced points of engagement along each side edge only is sufficient for proper orientation and alignment of a glass sheet immediately before it enters a processing station.

At the same time, since the actuating pistons 84 and clutches 78 are located outside the furnace, they are not subject to the furnace heat in the manner experienced by internally located actuating elements. Hence, the actuating elements have a long life expectancy before requiring repair or maintenance. Also, when repairs or maintenance is need, the furnace heat need not be disturbed and ready access is available to the actuating parts.

In a typical mass production operation in which a series of glass sheets is loaded in succession and conveyed through a furnace en route to a processing station such as the roller press bending apparatus described above, the present invention makes it unnecessary to place each individual sheet on the conveyor in exactly the proper orientation and alignment required for entry into the processing station. The glass sheets may be mounted on the conveyor before the entrance to the furnace in only an approximation to the desired orientation and alignment.

The present invention makes it unnecessary to guide the sheets continuously as they traverse the entire length of the furnace. The present invention makes it unnecessary to touch the leading and trailing edges of the individual glass sheets at all. All the present invention requires is momentary simultaneous contact at two longitudinally spaced points along the opposite side edges only of each sheet in succession as near to the furnace exit as practical. Simultaneous contact at the four points by members having a component of motion in the direction of conveyor movement at the glass sheet speed and a component of motion transverse to the direction of conveyor movement from movement control means disposed outside the hot atmosphere of the furnace provides adequate orientation and alignment for high-speed mass production operations.

The present invention reduces the number of conveyor rolls that must be in perfect alignment from all the rolls in the furnace and processing station to only those at the exit end of the furnace and in the processing station. This reduces conveyor maintenance costs and shut-down time for production considerably. In addition, momentary contact of the glass side edges provides much less chance for edge distortion or edge stress than the continuous contact existing in the prior art.

The form of the invention described in this disclosure represents an illustrative embodiment thereof. It is understood that various changes may be made without departing from the spirit of the invention as defined in the claimed subject matter that follows.

I claim:

1. Apparatus for aligning and orienting a glass sheet as the latter moves along an enclosed conveyor path at an established conveyor speed and approaches a glass sheet treatment station where it is desirable to have said glass sheet properly oriented and aligned with respect to said glass sheet treatment station, said apparatus comprising:

(1) a pair of carriages, (2) means defining an exterior path for each of said carriages extending from a first carriage position to a second carriage position along paths parallel to and outside of said enclosed conveyor path, (3) a pair of glass sheet engaging members carried by each of said carriages in spaced relation relative to said paths, (4) means to move each of said glass engaging members inward from a retracted position to a glass edge engaging position in a direction transverse to said paths, (5) means to move said carriages in unison from said first carriage position at said established conveyor speed along said exterior paths as said glass engaging members move into said glass engaging positions, (6) means to retract said glass engaging members to said retracted position after they have engaged the opposite side edges of the glass sheet to orient and align the latter, and (7) means to return said carriages from said second carriage position to said first carriage position.

2. Apparatus as in claim 1, further including glass sensing means and means responsive to said glass sensing mean to actuate said means to move said carriages from said first carriage position to said second carriage position.

3. Apparatus as in claim 1, further including stop means operatively connected to each of said means to move said glass engaging members inward to limit the innermost position occupied by said glass engaging member associated with each of said inward moving means.

4. Apparatus as in claim 3, further including means to adjust the position of each of said stop means.

5. Apparatus as in claim 4, wherein each of said adjusting means is adjustable independently of each other adjustment means to enable said glass engaging members to engage sheets of different patterns.

6. Apparatus as in claim 1, wherein said conveyor extends through a tunnel type furnace having transversely spaced, longitudinally extending side walls and a glass sheet treating station, and said means defining said exterior path for each of said carriages is disposed laterally outside of one or of the other of said side walls, each of said side walls is provided with a narrow longitudinal slot extending from the vicinity of said first carriage position to the vicinity of said second carriage position, narrow, elongated members connect each of said glass engaging members and each of said glass engaging member moving means extends through one or the other of said slots to permit said glass engaging members to move along said conveyor path from the vicinity of said first carriage position to the vicinity of said second carriage position along said conveyor path at the same speed as that of said glass sheets while said glass engaging members move from said retracted positions to said glass edge engaging positions.

7. Apparatus as in claim 6, wherein said glass sheet treating station is a shaping station comprising a first set of shaping rolls and a second set of shaping rolls adapted to move between a retracted position wherein said sets are disposed in spaced relation on opposite sides of an extension of said enclosed conveyor path and a glass engaging position wherein said sets engage the opposite major surfaces of said glass sheet on one side of said conveyor path extension.

8. Apparatus as in claim 1, wherein a plurality of horizontally aligned, transversely extending, longitudinally spaced rolls comprises said enclosed conveyor path, wherein said glass edge engaging members are supported by said narrow, elongated members in a plane slightly above a horizontal plane common to said spaced rolls to enable said glass engaging members to engage the side edges of said glass sheet out of contact with its bottom surface.

9. A method of treating glass sheets for subsequent processing in which a series of glass sheets is passed through an enclosed roll conveyor en route to a glass sheet processing station where it is important that each glass sheet is properly aligned and oriented, comprising mounting each sheet in succession in a horizontal orientation on a horizontal roll conveyor in approximately its desired orientation and alignment, conveying said sheet toward said processing station by rotating said rolls of said enclosed roll conveyor at a constant peripheral speed without touching the leading and trailing edges of said sheet, and just prior to the entry of said glass sheet into said processing station, momentarily engaging only the opposite side edges of said sheet at two spaced apart points by contacting each side edge with two spaced glass engaging members moving at the same speed as that of said glass sheet, and controlling the movement of said glass engaging members toward and away from said side edges from outside said enclosed conveyor.

10. A method as in claim 9, including the step of moving said glass engaging members while retracted from said side edges into position to engage the next sheet in said series at approximately the same position as that occupied by the previous glass sheet.

References Cited

UNITED STATES PATENTS

| | | | |
|---|---|---|---|
| 2,348,887 | 5/1944 | Drake | 65—273 X |
| 2,484,845 | 10/1949 | Nordquist et al. | 271—49 |
| 2,968,127 | 1/1961 | Woods | 65—273 X |
| 3,485,615 | 12/1969 | Rahrig et al. | 65—275 X |
| 3,545,951 | 12/1970 | Nedelec | 65—273 |
| 3,584,734 | 6/1971 | Richards et al. | 65—107 X |

ARTHUR D. KELLOGG, Primary Examiner

U.S. Cl. X.R.

65—107, 160, 273, 286; 209—90; 271—49